March 26, 1963  G. A. TINNERMAN  3,082,807
PLASTIC NUT HAVING METALLIC INSERT IMBEDDED THEREIN
Original Filed July 27, 1956
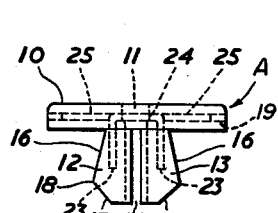
FIG. 1
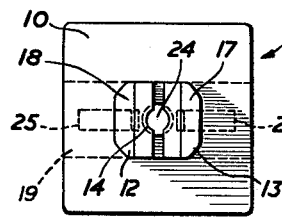
FIG. 2
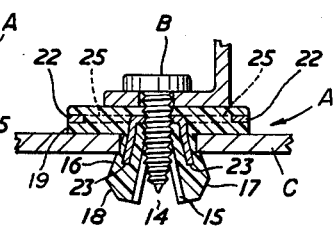
FIG. 3
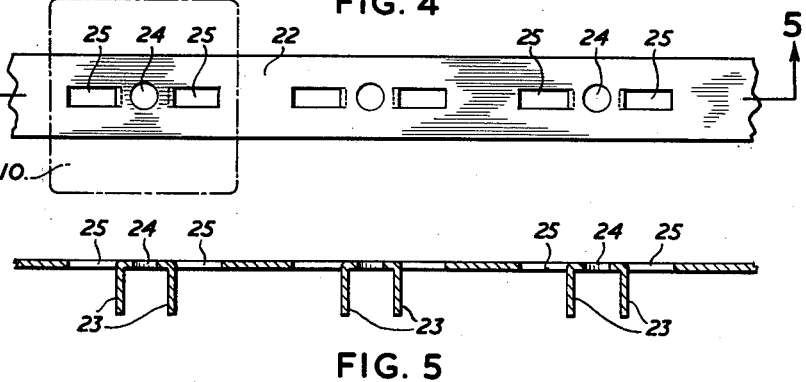
FIG. 4
FIG. 5
INVENTOR
GEORGE A. TINNERMAN
BY Featherstonhaugh & Co.
ATTORNEYS

United States Patent Office 3,082,807
Patented Mar. 26, 1963

3,082,807
PLASTIC NUT HAVING METALLIC INSERT
IMBEDDED THEREIN
George A. Tinnerman, 17864 Beach Road,
Lakewood 7, Ohio
Original application July 27, 1956, Ser. No. 600,499.
Divided and this application Jan. 26, 1960. Ser. No. 4,676
2 Claims. (Cl. 151—41.75)

This invention relates to wedging or expandable fasteners of a kind particularly adapted for blind locations, and is a division of application Serial No. 600,499, filed July 27, 1956, and now abandoned.

Fasteners of the general kind with which this invention is concerned have previously been made, preferably from a plastic material, embodying an orificed head having legs depending therefrom spaced apart from one another a distance less than the diameter of the said orifice, and in which the outer surface of the legs is given a flared formation so that when the fastener is disposed within an opening in a metal sheet or the like it may be wedged or anchored therein upon the passage of a screw through the orifice of the head which has the effect of spreading the legs apart so that the flared contour thereof will wedge and anchor the fastener in the opening. Plastic is preferable since it is more convenient to form than metal and may be used in a sealing and insulating capacity where required. Such fasteners are useful as a means of attaching shelves to the interior of refrigerators, may be employed to seal off moisture leakage to the interior insulated portion, and avoid destruction of the insulating qualities thereof. They are useful in various other capacities such as in radio chassis, having insulating value in respect of metallic structures carrying current and may be found desirable to insulate that part from the chassis, and are useful in many other applications. While this fastener is of great utility, it has an inherent disadvantage in that the plastic material very often does not have sufficient strength and as a result, the screw stud employed to achieve the fastening very often will strip out from the plastic, particularly under load, with consequent disadvantageous results. They also have a tendency to shear in similar circumstances.

The present invention employs the same general type of construction including formation from suitable plastic material but avoids the disadvantages of this previous fastener by rendering it resistant to stripping and shearing while providing in a simple manner, a durable fastener which can be produced with little difference in cost to prior products of this general character.

According to the invention, I provide a wedging or expandable fastener having a body of formable relatively yieldable material including an orificed head and a plurality of integral legs depending therefrom in spaced apart relation to form a channel therebetween disposed in registry with the orifice in the head, said orifice and said channel jointly forming a passage from the shank of a screw threaded stud wherein said passage is of less diameter than said orifice and the shank of said stud, said legs having a flared or offset outer surface capable of passage through an orifice in a member to receive the fastener, said legs being spreadable by said screw shank to anchor said fastener to said member, said head having an orificed thin plate of a harder material such as metal embedded therein with its orifice in registry with said orifice of the head and the periphery of the former orifice bordering on the periphery of the latter orifice and for threaded engagement with said screw stud and capable of resisting the thrust of said stud when in use, said fastener body retaining said stud from loosening, the said metal plate having a tang struck therefrom on each side of its orifice disposed substantially perpendicularly to the plate and in substantially parallel spaced apart relation to one another and embedded in said expandable legs to resist shear between said legs and said head.

The composite fastener units of the present invention may be formed in a continuous process which lends itself to production by automation and wherein the metal insert of the head may take the form of strip metal having the formable material applied thereto successively and the strip severed to produce individual fasteners but which may also be produced as multiple fasteners where desired by severing the strip at selected points depending upon the number of fasteners desired in the multiple unit.

The invention will be clearly understood by reference to the following detailed specification taken in conjunction with the accompanying drawings.

In the drawings:

FIG. 1 is a side elevation of the fastener of the present invention.

FIG. 2 is a bottom plan view of the fastener.

FIG. 3 is a longitudinal section taken through a mounted fastener of the type illustrated in FIGS. 1 and 2 and secured in a mounting by a screw stud.

FIG. 4 is a fragmentary plan view of a strip of metal around which the fasteners are formed and illustrating in dotted lines the head of a screw stud; and FIG. 5 is a longitudinal section taken on the line 5—5 of FIG. 4.

Referring to the drawings, A indicates the fastener as a whole which is preferably made from a formable plastic material such as nylon, polyethylene, etc., formed with a head 10 centrally orificed as at 11 and having integral legs 12 and 13 depending therefrom. The legs 12 and 13 are spaced apart from one another to form a channel 14 which is in registry with the orifice 11 of the head piece, the spacing of the legs being slightly less than the diameter of the orifice 11 in the head. The inner surface of the legs are grooved as shown in dotted lines at 15 to form part of the channel 14 for the reception of a screw stud. The outer faces of the legs are profiled or flared to provide the outwardly and inwardly sloped surfaces 16 and 17 providing a major span of the legs at the apex 18 and the fastener is designed to be projected into an opening in a member designed to receive such fastener and which is of such proportions as normally to receive the depending legs having regard to their point of maximum span. This structure is of generally known kind.

According to the present invention, I embed in the head a relatively thin plate-like element 19 of hard material, preferably metal which may be strip steel such as low carbon, but which also may be stainless type steel or other composition. This may be in the form of a washer-like element coinciding with the head having a central orifice which will register with the orifice 11 of the head wherein the periphery of the orifice of the plate is designed substantially to border the periphery of the orifice 11 and in effect constitute a thread or thread forming element for cooperation with a threaded stud B (shown in FIG. 3). Therefore, when the fastener is projected through an opening in an element such as C (FIG. 3) in which it is to be secured and upon introducing a screw stud such as B to the opening 11 in the head 10 and screwing it home, the legs 12 and 13 will spread to secure the fastener in the element C. In result, the plate cooperating with the screw threading of the stud has the effect of resisting the axial thrust of said stud under all conditions and the fastener body of relatively yieldable plastic material has the effect of retaining the stud from loosening. In this manner a most durable fastener is produced which avoids disadvantages of the past practice. The plate 19 has tangs 23 struck therefrom on each side of its central orifice, said tangs being of a suitable length to project substantially perpendicularly from the plate in spaced apart substantially parallel relation and to embed in the legs 16 as to reinforce the legs against shearing along the line of shear between the legs and the head where the legs are of narrower width. The enlarged orifices 25 formed in the plate by striking the tangs therefrom provide passages of substantial area, permitting the plastic material to flow through from one side of the plate to the other providing a well-bonded construction in the head.

Referring to FIG. 4, the plate 19 preferably takes the form of strip material 22 which is substantially narrower than the head 10, and adapted to pass through a machine in which the fastener body is molded thereto. This strip material, as illustrated, has the tangs 23 struck therefrom on each side of the central orifice 24, the tangs being disposed in spaced apart substantially parallel relation and leaving the elongated orifices 25 in the strip on each side of orifice 24, the tangs 23 being disposed so that they will coincide with the legs 12 and 13 of the fastener and will become embedded in these legs so as to reinforce the legs against shearing, which may otherwise result in some cases when the screw stud is driven home or when under load.

The strip material 22 is designed to be sheared between the fasteners formed thereon and may, if desired, be weakened along transverse lines for the purpose of permitting ready severance of the strip between such fastener unit. Alternatively, of course, where a multiple fastener unit is desired, the strip may be severed at selected points to include thereon a plurality of fastener elements to meet given requirements.

From the foregoing, it will be appreciated that in a simple manner I provide a fastener of most durable character which will overcome disadvantages of prior fasteners of this type and it will be obvious also that in comparison with the improved results obtained, the cost of the fastener will not greatly exceed that produced in accordance with past practice.

What I claim as my invention is:

1. A wedging fastener comprising a body of formable relatively hard but yieldable plastic material having an orificed head and a plurality of integral legs depending therefrom in spaced apart relation forming a channel therebetween disposed in registry with the orifice in said head, said orifice and said channel jointly forming a passage for the shank of a screw threaded stud, said passage being of less diameter than that of the shank of said stud, said legs being capable of passage through an orifice in a member to receive said fastener and being threadedly engageable by and spreadable by said screw shank to anchor said fastener to said member, said legs being non-circular in cross-section as to prevent rotation of the fastener when located in an orificed receiving member and being enlarged intermediate their extent substantially to form laterally and outwardly extending opposed apices, said head having a centrally orificed plate of relatively thin thrust resisting metal embedded therein, with its orifice in registry with and of a diameter substantially the same as the diameter of said head orifice so that the periphery of the former borders on the periphery of the latter, said plate having tangs struck therefrom, one on each side of its orifice forming enlarged orifices in said plate for passage therethrough of said body material, said tangs being bent at a point adjacent to said orifice and being disposed in substantially parallel spaced apart relation to one another substantially normal to said plate and embedded in said expandable legs to provide shear resisting means crossing the line of shear between said body and said legs, said body and said plate being jointly engageable with the threads of said stud when in use and jointly resisting the thrust of a stud engaged in said fastener, said body acting additionally to retain said stud from loosening.

2. A wedging fastener comprising a body of formable relatively hard but yieldable plastic material having an orificed head and a plurality of integral legs depending therefrom in spaced apart relation forming a channel therebetween disposed in registry with the orifice in said head, said orifice and said channel jointly forming a passage for the shank of a screw threaded stud, said passage being of less diameter than that of the shank of said stud, said legs being capable of passage through an orifice in a member to receive said fastener and being threadedly engageable and spreadable by said screw shank to anchor said fastener to said member, said legs being non-circular in cross-section as to prevent rotation of the fastener when located in an orificed receiving member and being enlarged intermediate their extent substantially to form laterally and outwardly extending opposed apices, an orificed, relatively hard, thrust resisting thin metal plate embedded in said head and extending from one side edge thereof to the opposite edge, the orifice in said plate being in registry with and of a diameter substantially the same as said head orifice so that the periphery of the former borders on the periphery of the latter, said plate and said body being engageable jointly with the threads of said stud when in use, said plate having a tang struck therefrom on opposite sides of its orifice and forming in said plate elongated orifices for passage therethrough of said body material, said tangs being disposed substantially perpendicularly to the plate in spaced apart relation and crossing the line of shear between said head and said legs and being embedded in said legs, said plate and said body jointly acting to resist the axial thrust of a stud engaged in said fastener when in use, said fastener body retaining said stud from loosening and said tangs forming shear resistant means between the head and legs of said body.

References Cited in the file of this patent
UNITED STATES PATENTS

| | | |
|---|---|---|
| 1,742,014 | Smith | Dec. 31, 1929 |
| 2,036,875 | Kraft | Apr. 7, 1936 |
| 2,653,334 | Bay | Sept. 29, 1953 |
| 2,788,047 | Rapata | Apr. 9, 1957 |